United States Patent
Gurusamy et al.

(10) Patent No.: US 12,033,525 B2
(45) Date of Patent: *Jul. 9, 2024

(54) METHOD AND SYSTEMS FOR PROVIDING CONTEXTUAL BUILDING HEIGHT INFORMATION TO AIRCRAFT OPERATORS

(71) Applicant: Honeywell International Inc., Charlotte, NC (US)

(72) Inventors: Saravanakumar Gurusamy, Tamil Nadu (IN); Madhava Gadicherla, Karnataka (IN); Jayasenthilnathan Balasubramanian, Tamil Nadu (IN)

(73) Assignee: Honeywell International Inc., Charlotte, NC (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/544,334

(22) Filed: Dec. 7, 2021

(65) Prior Publication Data

US 2023/0109847 A1    Apr. 13, 2023

(30) Foreign Application Priority Data

Oct. 12, 2021 (IN) .............................. 202111046419

(51) Int. Cl.
*G08G 5/00* (2006.01)
*G06F 16/29* (2019.01)
*G08G 5/04* (2006.01)

(52) U.S. Cl.
CPC ........... *G08G 5/0086* (2013.01); *G06F 16/29* (2019.01); *G08G 5/0021* (2013.01); *G08G 5/003* (2013.01); *G08G 5/045* (2013.01)

(58) Field of Classification Search
CPC .... G08G 5/0086; G08G 5/0021; G08G 5/003; G08G 5/045; G06F 16/29

(Continued)

(56) References Cited

U.S. PATENT DOCUMENTS 7,164,883 B2  1/2007  Rappaport et al.
7,599,766 B2  10/2009 Ardila et al.

(Continued)

FOREIGN PATENT DOCUMENTS

CN  103354041 A  10/2013
CN  213302860 U  12/2020

(Continued)

OTHER PUBLICATIONS

Garmin, "MX20 color Multi-Function Display pilot's guide passage", Garmin Color Multi-Function Display Pilot's Guide, Garmin.

(Continued)

*Primary Examiner* — Mahmoud S Ismail
(74) *Attorney, Agent, or Firm* — Alston & Bird LLP (57) ABSTRACT

Disclosed are methods, systems, and non-transitory computer-readable media for providing contextual building height information to one or more operators of an aircraft. For instance, the method may include obtaining aircraft flight information including a current position and a current altitude of the aircraft; and retrieving, from a database, building information for one or more buildings located in a flight path area, the flight path area including the current position of the aircraft. The method may further include assigning one or more visual characteristics to each of the one or more buildings located in the flight path area based at least in part on the building information and the current altitude of the aircraft; and displaying, to the one or more operators of the aircraft, the one or more buildings located in the flight path area with the assigned one or more visual characteristics.

20 Claims, 7 Drawing Sheets

(58) Field of Classification Search
USPC .......................................................... 701/9
See application file for complete search history.

(56) References Cited

U.S. PATENT DOCUMENTS

| | | | |
|---|---|---|---|
| 8,098,176 | B2 | 1/2012 | Ishihara et al. |
| 8,755,954 | B1 | 6/2014 | McCusker et al. |
| 2006/0220920 | A1* | 10/2006 | McCauley ........... G08G 5/0021 340/963 |
| 2007/0265776 | A1 | 11/2007 | Meunier et al. |
| 2010/0194602 | A1 | 8/2010 | Engels et al. |
| 2015/0170525 | A1 | 6/2015 | Conner et al. |
| 2018/0102058 | A1 | 4/2018 | Cao |
| 2020/0342770 | A1 | 10/2020 | Shinya |
| 2021/0026377 | A1 | 1/2021 | Huang et al. |
| 2022/0369135 | A1 | 11/2022 | Gurusamy et al. |

FOREIGN PATENT DOCUMENTS

| | | |
|---|---|---|
| EP | 2899509 A1 | 7/2015 |
| JP | 6512679 B2 | 5/2019 |

OTHER PUBLICATIONS

Hess, Randall et al, "A low-latency, low-throughput graphical architecture for multi-sensor pilotage displays", SPIE Proceedings; [Proceedings of SPIE ISSN 0277-786X], SPIE, US, (May 18, 2020), vol. 11424, pp. 1142409-1-1142409-9.

Bertram, Joshua R., et al., "Distributed Computational Guidance For High-Density Urban Air Mobility With Cooperative And Non-Cooperative Collision Avoidance", *Iowa State University*, pp. 1-14.

Bertram, Joshua R., et al., "Online Flight Planner With Dynamic Obstacles For Urban Air Mobility", *Iowa State University*, pp. 1-17.

European search report Mailed on Mar. 3, 2023 for EP Application No. 22197089, 10 page(s).

* cited by examiner

METHOD AND SYSTEMS FOR PROVIDING CONTEXTUAL BUILDING HEIGHT INFORMATION TO AIRCRAFT OPERATORS

CROSS-REFERENCE TO RELATED APPLICATIONS

This application claims the benefit of priority under 35 U.S.C. § 119 from Indian Patent Application No. 202111046419, filed on Oct. 12, 2021, the contents of which are incorporated by reference in their entirety.

TECHNICAL FIELD

Various embodiments of the present disclosure relate generally to the field of navigation for urban air mobility vehicles and, more particularly, to systems and methods for providing contextual building height information to aircraft operators.

BACKGROUND

Urban air mobility (UAM) vehicles are often used to navigate at low altitudes in regions with features such as tall buildings and structures, including some buildings on which the UAM vehicle may land. While navigating such airspaces at lower altitudes, traditional navigation views may not provide the vehicle operator with relevant information such as the heights of the buildings relative to the current and/or planned altitude of the vehicle. On the other hand, more complex three dimensional navigation views may be cluttered, for example, with buildings not relevant to the present altitude potentially obscuring more relevant buildings or obstacles. Further, navigation systems may require substantial attention of the vehicle operator to avoid collisions.

The present disclosure is directed to overcoming one or more of these above-referenced challenges.

SUMMARY OF THE DISCLOSURE

According to certain aspects of the disclosure, systems and methods are disclosed for providing contextual building height information to aircraft operators.

For instance, a method for providing contextual building height information to one or more operators of an aircraft can include obtaining aircraft flight information including a current position and a current altitude of the aircraft; and retrieving, from a database, building information for one or more buildings located in a flight path area, the flight path area including the current position of the aircraft. The method may further include assigning one or more visual characteristics to each of the one or more buildings located in the flight path area based at least in part on the building information and the current altitude of the aircraft; and displaying, to the one or more operators of the aircraft, the one or more buildings located in the flight path area with the assigned one or more visual characteristics.

Moreover, a system for providing contextual building height information to aircraft operators may include a display including one or more screens, a memory storing instructions, and a processor executing the instructions to perform a process for providing contextual building height information to one or more operators of an aircraft. The process performed can include obtaining aircraft flight information including a current position and a current altitude of the aircraft; and retrieving, from a database, building information for one or more buildings located in a flight path area, the flight path area including the current position of the aircraft. The process can further include assigning one or more visual characteristics to each of the one or more buildings located in the flight path area based at least in part on the building information and the current altitude of the aircraft; and displaying, to the one or more operators of the aircraft, the one or more buildings located in the flight path area with the assigned one or more visual characteristics on the display.

Moreover, a system may include an aircraft control system, a display including one or more screens, a memory storing instructions, and a processor executing the instructions to perform a process for providing contextual building height information to one or more operators of an aircraft. The process performed can include obtaining aircraft flight information including a current position and a current altitude of the aircraft from the aircraft control system; retrieving, from a database, building information including a height value for each of one or more buildings located in a flight path area, the flight path area including the current position of the aircraft; and determining a height difference between the current altitude of the aircraft and the height value for each of the one or more buildings. The process can further include generating one or more building groups based on the height difference calculated for each of the one or more buildings, wherein each of the one or more building groups includes buildings of the one or more buildings having height differences within a predetermined range; determining which of the one or more buildings is located within a safety envelope of the current position and the current altitude of the aircraft; and assigning one or more visual characteristics to each of the one or more buildings such that each of buildings in the one or more building groups is assigned the same one or more visual characteristics. The process can continue by assigning an animated visual characteristic to the buildings of the one or more buildings determined to be within the safety envelope; and displaying on the display, to the one or more operators of the aircraft, the one or more buildings located in the flight path area with the assigned one or more visual characteristics.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for urban air mobility vehicles and, more particularly, to systems and methods for providing contextual building height information to aircraft operators.

The present disclosure is directed to overcoming one or more of the challenges discussed above. As UAM vehicles generally operate at lower altitudes than other traditional aircraft, the presence of buildings and other structures in the airspace is relevant to aircraft operators. Accordingly, aircraft may be fitted with a number of displays and navigation aids to provide the operators with information, for example, the positions and heights of buildings in the airspace. When operating the aircraft, the operators may desire certain information and/or interface views during certain flight situations, for example, providing top, lateral, and/or three-dimensional views of the airspace with buildings tall enough to be in or near the flight path highlighted or distinguished. Conversely, there may be situations in which there is too much information being conveyed on a crowded display, for example, displaying buildings far below the flight path.

In general, the present disclosure is directed to systems and methods that are able to address one or more of the above challenges by providing contextual building height information to aircraft operators to keep them fully apprised of the airspace and able to view relevant information about buildings that may need to be navigated around. For instance, a system may provide the operator of a vehicle with a visual representation of each of the relevant buildings and structures present in the airspace along with visual characteristics that allow the operator to determine the building height relative to the vehicle altitude visually, and at a glance. The systems and/or methods of the present disclosure for providing contextual building height information to aircraft operators may have an advantage of reducing the burden on the vehicle operator, thereby allowing the operator to place more attention on other critical aspects of the vehicle flight.

Therefore, by providing contextual building height information, operators may be able to be aware of the buildings most relevant to the current or future flight situation, as opposed to having views that do not distinguish the most relevant buildings to the vehicle's current or planned altitude.

While this disclosure describes the systems and methods with reference to aircraft, it should be appreciated that the present systems and methods may be applicable to various other vehicles, including those of drones, automobiles, ships, spacecraft, or any other manned, unmanned, autonomous, and/or internet-connected vehicles.

Figure 1:
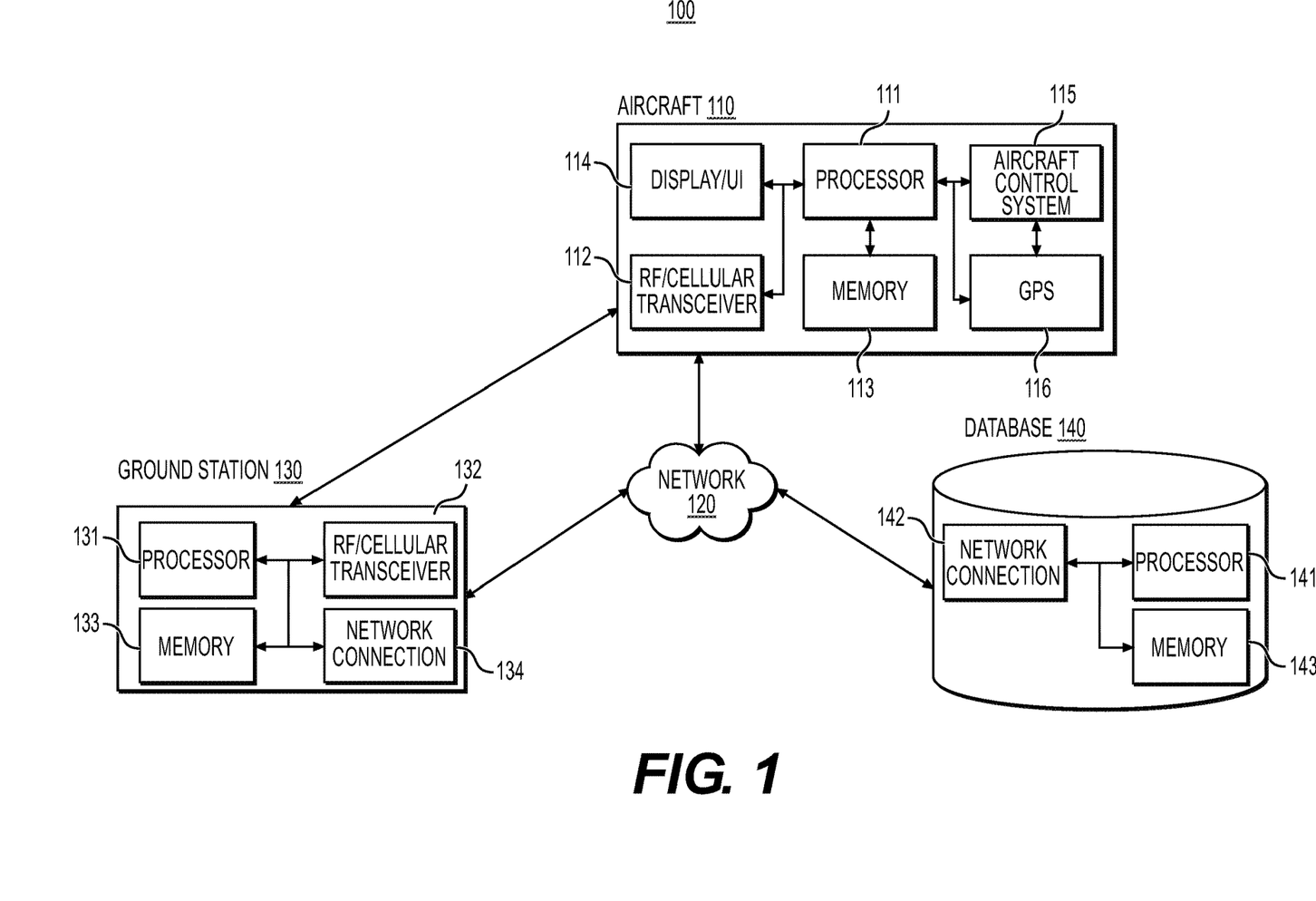
FIG. 1 depicts an exemplary system environment in which methods, systems, and other aspects of the present disclosure may be implemented.

FIG. 1 depicts an example of a system environment 100 in which systems, methods, and other aspects of the present disclosure may be implemented. The system environment 100 of FIG. 1 may include an aircraft 110, a network 120, one or more ground stations 130, and a database 140. Aircraft 110 may include processor 111 in communication with a plurality of other components such as RF/cellular transceiver 112, memory 113, display/user interface (UI) 114, aircraft control system 115, and GPS 116. Processor 111 may include one or more processors that comprise the computing and flight management systems of aircraft 110. Memory 113 may be one or more components configured to store data related to aircraft 110, including instructions for operating flight components and aircraft systems (e.g., autopilot, route planning, communication). Processor 111 and memory 113 may display information to, and receive inputs from an operator of aircraft 110 via display/UI 114. Display/UI 114 may be of any suitable type, such as one or more monitors, touchscreen panels, heads-up displays, and may include operator input devices such as joysticks, buttons, touch-responsive panels, mice, trackpads, voice recognition devices, and the like.

Aircraft 110 can include aircraft control system 115 to serve as the controller of flight components and aircraft systems (e.g., control surfaces, propulsion). In some embodiments, aircraft control system 115 may communicate with GPS 116 in order to, for example, locate aircraft 110 in the airspace. Without deviating from the scope of this disclosure, aircraft 110 may have additional elements that can be in communication with aircraft control system 115 and/or processor 111.

Aircraft 110 may use RF/cellular transceiver 112 to communicate with other elements of the system environment, for example, via network 120 or directly by radio communication. Network 120 may be implemented as, for example, the Internet, a wireless network, Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless Internet connection in combination with a cellular data network.

To aid and/or guide aircraft 110, one or more ground stations 130 may provide aircraft 110 with information, such as information regarding flight plans, buildings/obstacles, air traffic, weather conditions, and/or other information useful for the flight of aircraft 110. A ground station 130 may include a processor 131, an RF/cellular transceiver 132, memory 133, and network connection 134. Processor 131 and memory 133 may collect and transmit information via RF/cellular transceiver 132 and/or network connection 134. Ground station 130 may be in communication with, for example, air traffic control, meteorologists, and one or more databases 140.

One or more databases 140 may be repositories for system information such as map data, building data, flight plan data, and the like. Database 140 may include a processor 141, a network connection 142, and a memory 143. Memory 143 may store data, processor 141 may access and organize the stored data to respond to requests and provide updates to the stored data, and information may be provided to other elements in system environment 100 via network connection 142. In some embodiments, database 140 may communicate directly with aircraft 110 via network 120. Further, ground station 130 may be able to relay requests for information from aircraft 110 to database 140 via RF/cellular transceiver 132 and/or network connection 134.

Figure 2:
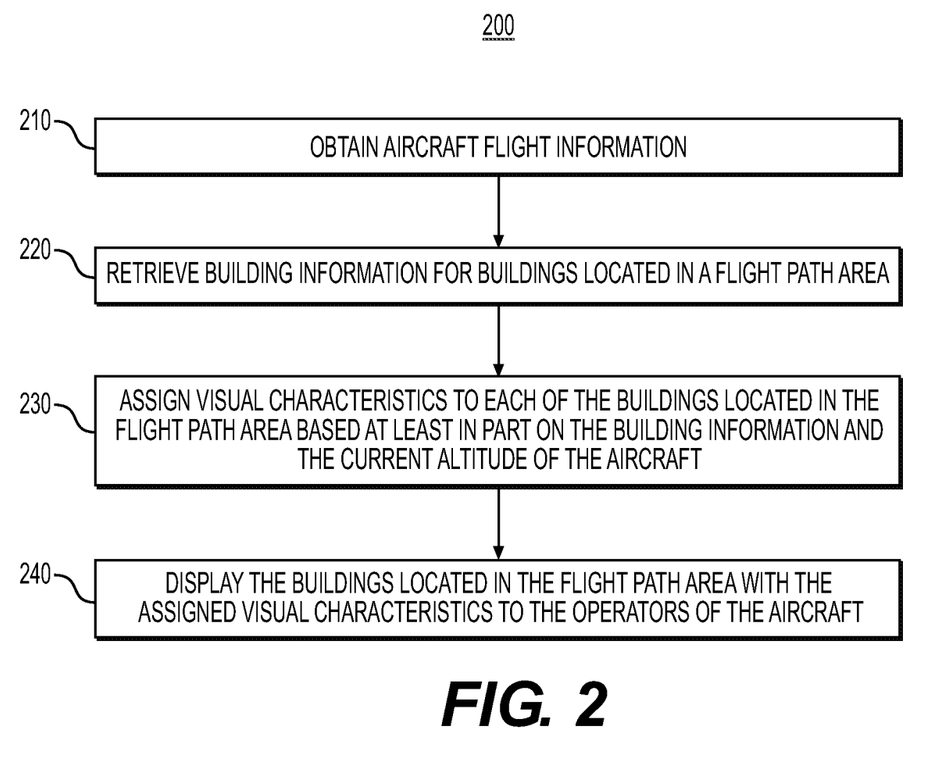
FIG. 2 depicts a flowchart for an exemplary process for providing contextual building height information to aircraft operators, according to one or more embodiments.

FIG. 2 illustrates an exemplary method 200 for providing contextual building height information to aircraft operators in accordance with embodiments of the present disclosure. It should be understood that the steps described herein, and the sequence in which they are presented, are merely illustrative such that additional and/or fewer steps may be included without departing from the scope of the present disclosure.

Beginning at step 210, processor 111 may obtain aircraft flight information, for example, from aircraft control system 115. For example, aircraft flight information may include one or more of a current position, a current trajectory, and/or a target destination.

Having obtained the aircraft flight information, at step 220, the system may then retrieve building information for one or more buildings located in an area around the flight path and aircraft 110. This can include, for example, map data; information regarding the heights, dimensions, and positions of one or more buildings; and/or other information that may be relevant to an aircraft that is or will be in the vicinity of one or more buildings.

Using the aircraft altitude and the building information, at step 230, processor 111 may assign visual characteristics to each of the buildings and structures located in the flight path area. For example, this may include assigning one or more visual characteristics to buildings based on their height relative to the aircraft altitude and/or buildings that may be directly in the flight path. In some embodiments, processor 111 may calculate a height difference between the buildings and the current altitude of aircraft 110, and group buildings with calculated height differences in a predefined range together to be assigned the same or similar visual characteristics. Other characteristics can also be considered when assigning visual characteristics and/or grouping buildings, for example, the proximity of the building to the current position of aircraft 110. In some embodiments, an area in which aircraft 110 will pass in a given time, for example 30 seconds, may be determined or calculated using a current speed of the aircraft and used by processor 111 while assigning visual characteristics and/or grouping buildings. In some embodiments, each building may be assigned a visual characteristic according to the specific height difference calculated, such that the visual characteristics fall along a spectrum or gradient.

The visual characteristics assigned to each building may include such variations as, for example, color, opacity, texture, symbology, luminescence, and/or visual effects such as blinking or flashing. In some embodiments, the operator of aircraft 110 may be able to determine their own set of visual characteristics based on a preference, such as the use of a preferred color for the various relative building heights or the avoidance of colors that the operator may not be able to distinguish (e.g., an operator with red-green color blindness). Aircraft operators can be aware of the assignment criteria, and therefore may be able to determine, based on the visual characteristic applied, that a building in the airspace is within a predetermined range of the aircraft's altitude.

Once processor 111 has determined which visual characteristics should be assigned to a building or structure, at step 240, the buildings and structures may be displayed, for example, on display/UI 114 so that the operators of the aircraft can observe the relative heights of the buildings and structures in the airspace.

Figure 3:
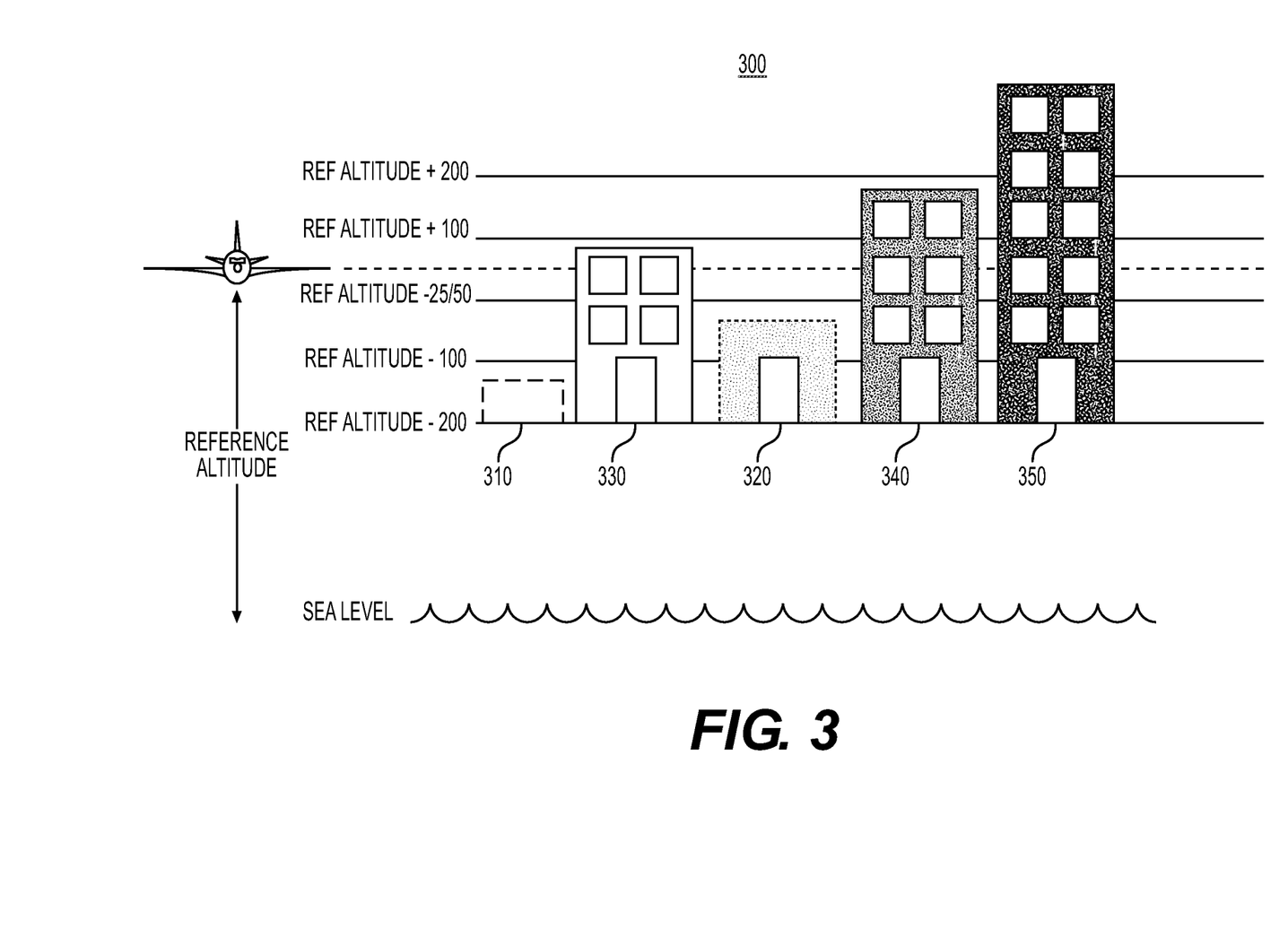
FIG. 3 depicts an exemplary graphical user interface, according to one or more embodiments.

As noted above, the manner in which the visual characteristics are assigned to the buildings and structures may vary based on a number of factors and contexts. A visual characteristic may be assigned based on, for example, how tall the building or structure is relative to a current operational altitude of the aircraft. An exemplary visual characteristic legend 300 is shown in FIG. 3.

Legend 300 may include two or more categories from the buildings, for example, five categories. The categories may allow the system to group buildings together based on, for example, the relative height of those buildings with respect to the reference altitude of the aircraft. The lowest building 310 can be a representation of a building that is the furthest below the reference altitude. Building 310 may be assigned a visual characteristic that is reflective of the relative importance of building 310. This visual characteristic may be a light color, a partially transparent rendering, a broken line style for the outline, and/or a similarly de-emphasized characteristic. De-emphasizing building 310 may allow the vehicle operator to pay the least attention to buildings having the lowest likelihood of collision and buildings that need not be navigated around.

The next lowest building 320 can be a representation of a building that is below the reference altitude, but within a predetermined range below the reference altitude. As discussed with respect to building 310, building 320 may be assigned a visual characteristic that is reflective of the relative importance of building 320. This visual characteristic may be more emphasized than building 310, but building 320 may still be assigned a light color, a partially transparent rendering, a broken line style for the outline, and/or a similarly de-emphasized characteristic, provided the characteristic is more noticeable than the characteristic assigned building 310. De-emphasizing building 320, while ensuring that it is still visible, may allow the vehicle operator to pay some attention to buildings having a low likelihood of collision and buildings that need not be navigated around, but due to the possibility that a minor change in altitude may bring building 320 into the flight path, it may still be desirable for the vehicle operator to be aware of the location of building 320.

Building 330 may represent buildings that pose a more immediate danger of collision, such as buildings that are at or near the reference altitude of the aircraft. As discussed with respect to buildings 310 and 320, building 330 may be assigned a visual characteristic that is reflective of the relative importance of building 330. This visual characteristic may be more emphasized than building 320, but building 330 may still be assigned a brighter color, a less transparent rendering, a solid line style for the outline, and/or a similarly emphasized characteristic, provided the characteristic is more noticeable than the characteristic assigned buildings 310 and 320. Emphasizing building 330, and ensuring that it is clearly visible, may allow the vehicle operator to pay appropriate attention to buildings having a moderate likelihood of collision and buildings that may need to be navigated around or over. Because building 330 that is around the same height as the reference altitude, navigating over it may take little to no control input from the vehicle operator.

Building 340 may represent buildings that pose an immediate danger of collision, such as buildings that are taller than the reference altitude of the aircraft. The visual characteristic assigned to building 340 may be emphasized, such as a bright color, a non-transparent rendering, a solid and/or bold line style for the outline, and/or a similarly emphasized characteristic, preferably provided that the characteristic is more noticeable than the characteristic assigned to buildings 330. Emphasizing building 340, and ensuring that it is clearly visible and noticeable at a glance, may allow the vehicle operator to pay appropriate attention to buildings having a likelihood of collision and buildings that may need to be navigated around or over. Because building 340 is above the height of the reference altitude, navigating over it may require a significant control input from the vehicle operator, and may possibly require evasive action be taken in advance of the vehicle approaching building 340.

Building 350 may represent buildings that pose an immediate danger of collision, and that may not be navigated over, such as buildings that are significantly taller than the reference altitude of the aircraft. The visual characteristic assigned to building 350 may be particularly emphasized, such as a very bright color, an opaque rendering, a solid and/or bold line style for the outline, and/or a similarly emphasized characteristic, preferably provided that the characteristic is more noticeable than the characteristic assigned to buildings 340. Emphasizing building 350, and ensuring that it is unmistakably visible and immediately noticeable, may allow the vehicle operator to pay immediate attention to buildings having a high likelihood of collision, such as buildings that may need to be navigated around and that may not be easily navigated over. Because building 350 is well above the height of the reference altitude, navigating over it may not be practical, or may require early intervention by the vehicle operator.

Figure 4:
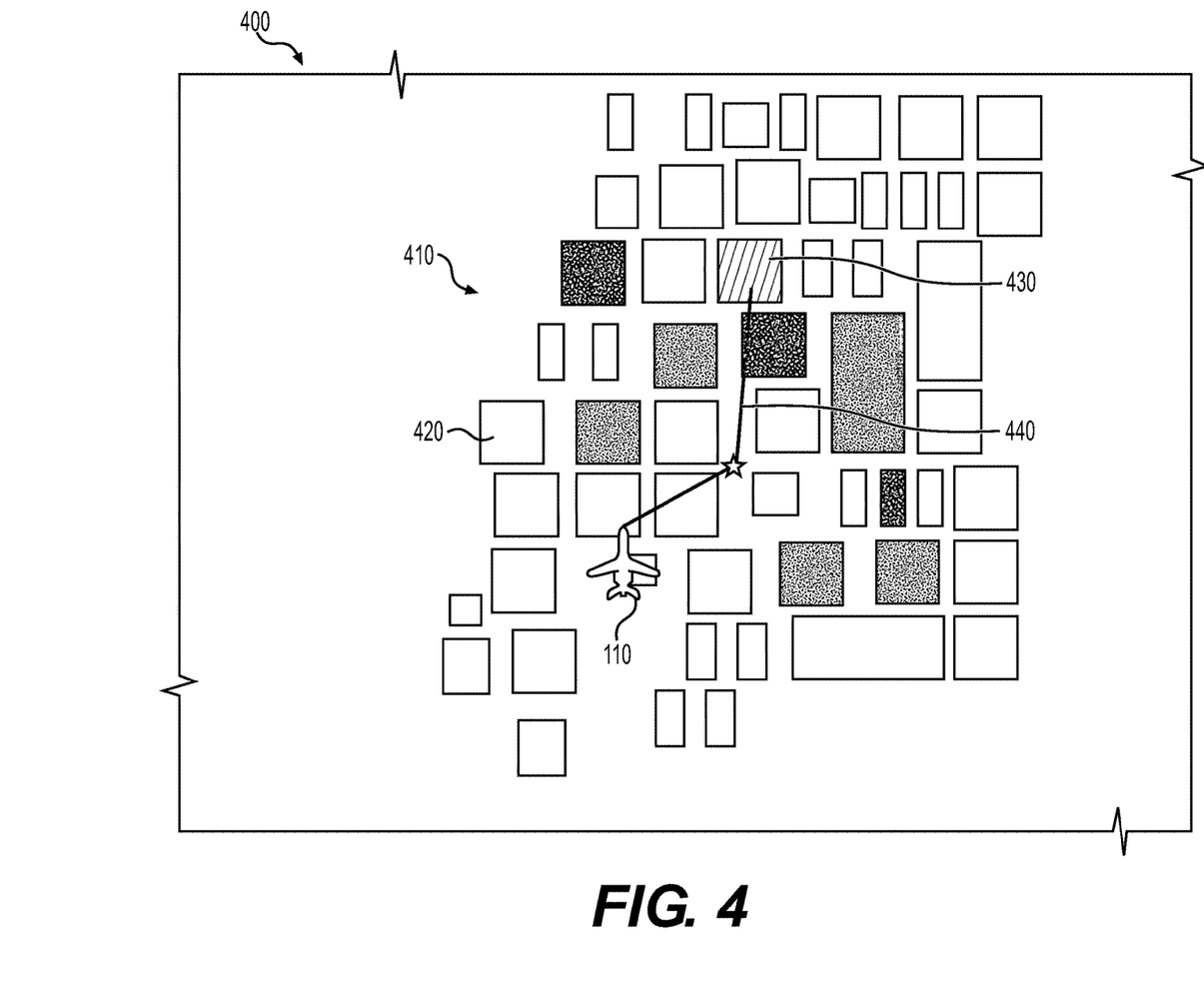
FIG. 4 depicts exemplary visual coding for buildings with respect to an aircraft, according to one or more embodiments.

An exemplary GUI 400 in accordance with legend 300 is shown in FIG. 4. GUI 400 may include an airspace 410, buildings/structures 420, a destination 430, and an intended flight path 440. This display configuration may enable an operator of aircraft 110 to identify buildings/structures 420 that may impede the progress of aircraft 110 along intended flight path 440 to destination 430 at a glance.

As illustrated in FIG. 4, multiple buildings 420 along the flight path 440 at the current vehicle altitude are taller than the vehicle altitude, and may need to be navigated above or around. For example, the building 420 has been assigned a visual characteristic such as that assigned to building 350, which may indicate that the building is substantially taller than the current altitude of aircraft 110. As such, the operator of aircraft 110 may be aware that the flight path 440 may require a significant change in altitude, or may require a diversion around the obstacle. Being able to quickly identify these conflicts along flight path 440 may allow the operator ample time to plan such a maneuver.

Figure 5:
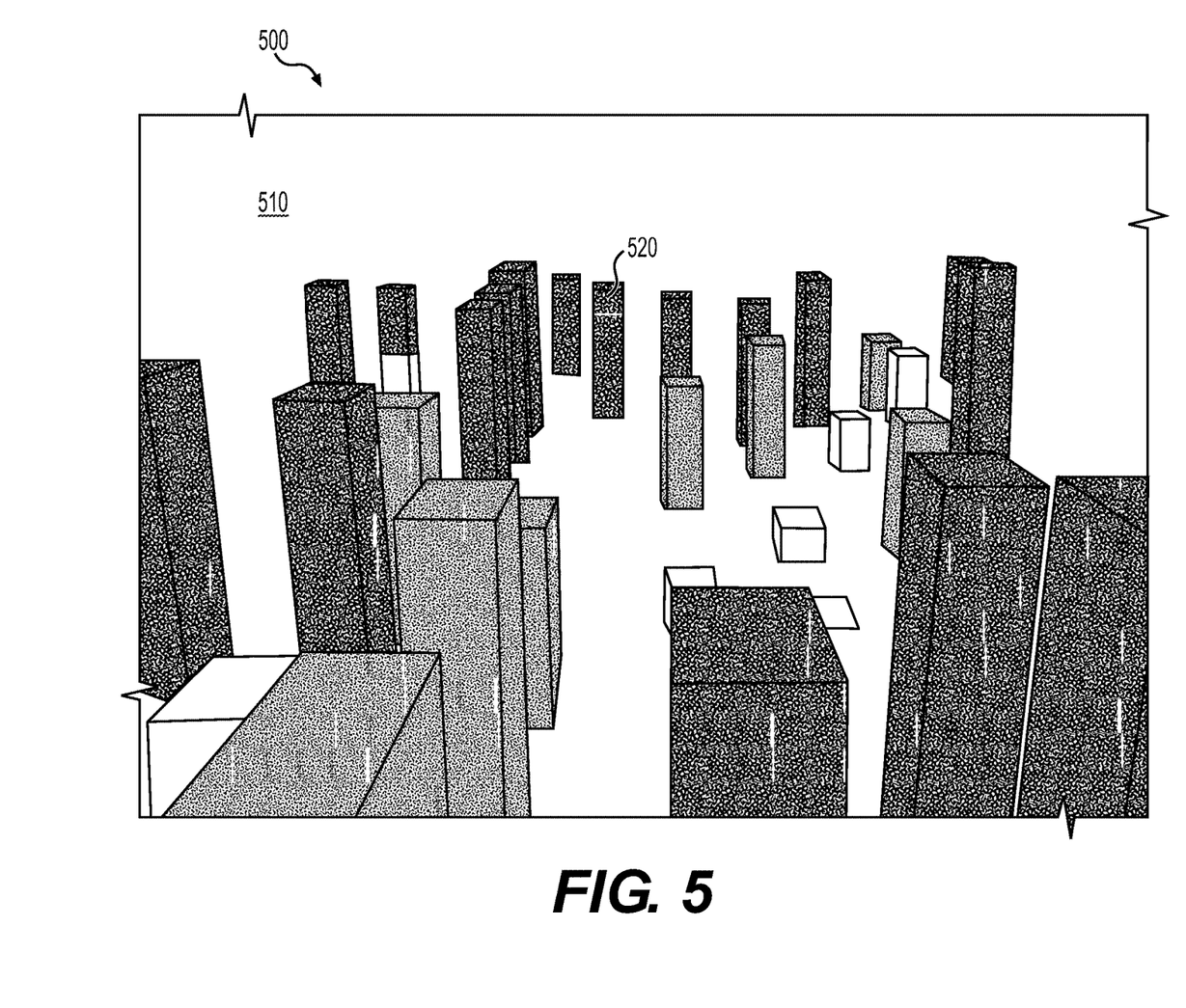
FIG. 5 depicts an exemplary 3-D graphical user interface, according to one or more embodiments.

Assigning visual characteristics to aid the aircraft operator in navigating an airspace may also include applying those characteristics to a three-dimensional GUI 500, as depicted in FIG. 5. GUI 500 may include a rendering or other depiction of an airspace 510 having a plurality of buildings/structures 520 positioned therein. In some embodiments, GUI 500 can be an augmented reality view of airspace 510 from the perspective of the aircraft. Such an augmented reality view may be generated through a combination of visual information from a camera or cameras positioned in the aircraft along with visual characteristics assigned based on the building information.

In other embodiments, GUI 500 may be a virtual rendering of the buildings 520 known to be present in airspace 510 via the building information retrieved and/or information gathered from one or more sensors of the aircraft. In either event, the operator of the aircraft may be more able to focus on the potential obstacles in the flight path, while not being distracted by much shorter buildings 520 that may be present in airspace 510.

In some applications, aircraft 110 may have multiple and/or configurable displays 114 capable of providing a plurality of views, including a map view as illustrated in FIG. 4 and/or a three-dimensional view as illustrated in FIG. 5. Another type of view that may be generated by aircraft 110 is a lateral profile, an example of which is depicted in FIGS. 6A-C.

Figure 6A:
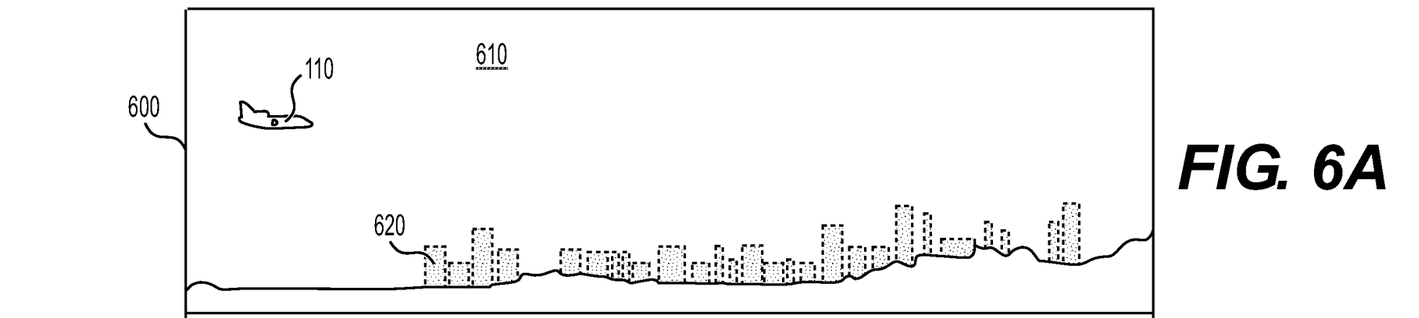
FIGS. 6A-C depict an exemplary graphical user interface depicting a lateral profile, according to one or more embodiments.
Figure 6B:
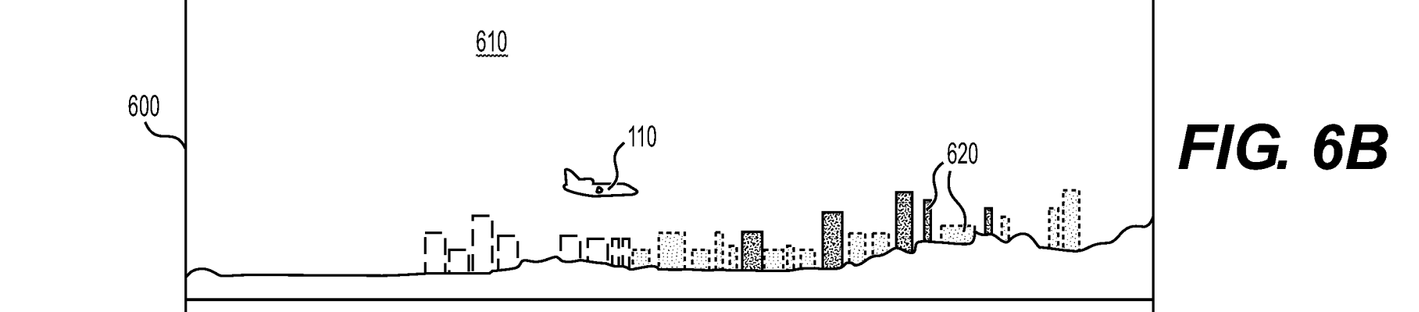
Figure 6C:
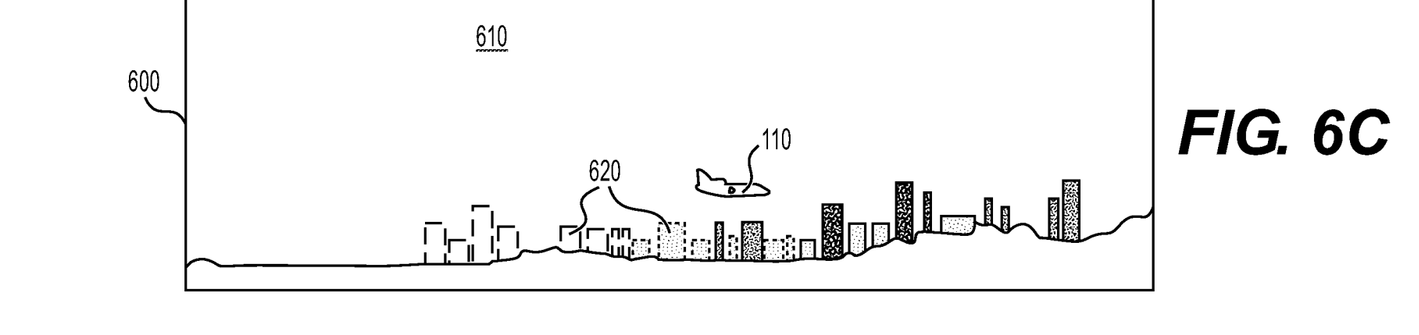

FIG. 6A shows GUI 600 as aircraft 110 descends through airspace 610 over buildings/structures 620. At this altitude, all of the buildings 620 are sufficiently low as to not be relevant to the navigation of aircraft 110. As aircraft 110 continues to descend through airspace 610, as depicted in FIG. 6B, certain of buildings 620 are dynamically assigned visual characteristics, for example, as described above with respect to FIG. 3. At this lower altitude, the operator of aircraft 110 may benefit from being aware of the tallest of buildings 620 that may need to be navigated over or around as aircraft 110 approaches a destination. Finally, as depicted in FIG. 6C, aircraft 110 has descended such that the tallest of buildings 620 are potential collision hazards, and as the dynamically assigned visual characteristics are updated, the operator of aircraft 110 may be able to quickly determine which buildings 620 may pose a collision hazard in order to be able to navigate around or over them as aircraft 110 approaches a destination at a lower altitude.

Figure 7:
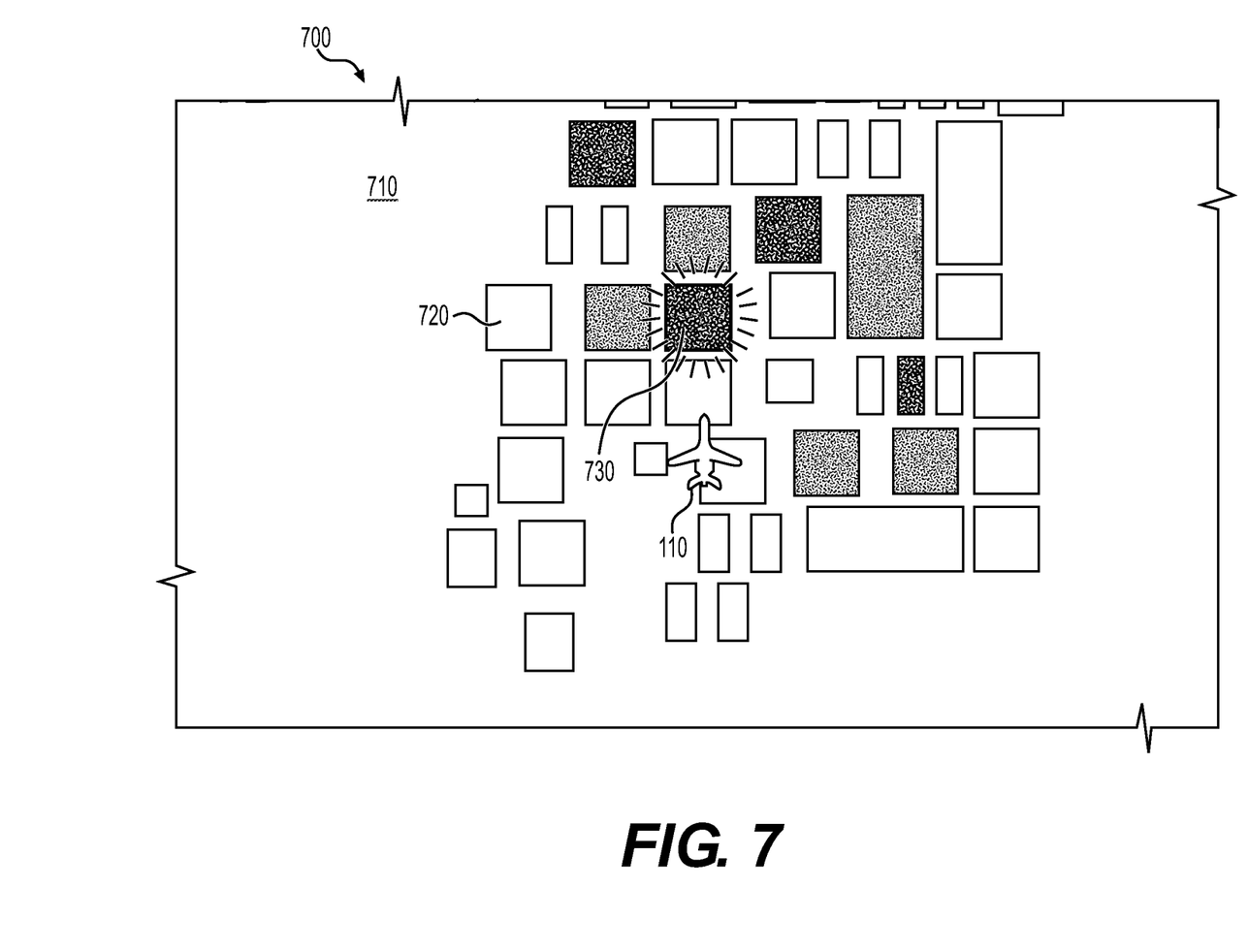
FIG. 7 depicts an exemplary graphical user interface including a representation of animated warnings, according to one or more embodiments.

In some embodiments, a GUI 700 according to the present disclosure may include additional visual characteristics to alert the operator of the aircraft to imminent collision threats. FIG. 7 illustrates an exemplary GUI 700 showing aircraft 110 navigating airspace 710 and buildings/structures 720. As depicted, aircraft 110 may be on a path that would result in a collision if evasive action is not taken by the operator. In such a circumstance, GUI 700 may apply one or more additional layers of visual emphasis to collision threat 730, such as a bold outline or animated effect such as flashing or blinking. For example, GUI 700 may determine or calculate a safety envelope based on the current position and altitude of aircraft 110, and apply additional visual characteristics to buildings determined to be within the safety envelope. Such a system could be configured to, for example, provide early collision warnings based on the time it would take to reach collision threat 730 and/or the distance to the collision threat 730.

GUI 700 may further provide an audible alarm or other notification to the operator of aircraft 110 via display/UI 114. Such emphasis, which can be in combination with an audible or other manner of alert, may allow the operator of aircraft 110 to take immediate evasive action in time to avoid colliding with collision threat 730. In some embodiments, the visual characteristics and/or the audible alert may be able to notify the operator of aircraft 110 not only of the impending collision, but also what evasive action may be taken. For example, in a circumstance of collision threat 730 is substantially taller than the current altitude of aircraft 110, making navigation over collision threat 730 impractical, the operator may be properly alerted (visually, audibly, or otherwise) that collision threat 730 will need to be laterally navigated around.

In some embodiments, processor 111 may calculate and reassign visual characteristics based on a planned altitude provided by an operator or otherwise obtained from a flight plan, rather than the current altitude of aircraft 110. Such a system could allow an operator of aircraft 110 to evaluate a flight plan or potential altitude change prior to changing the altitude of aircraft 110. The reassigned visual characteristics could be selectively displayed to the operator of aircraft 110 via display/UI 114.

By selectively displaying the reassigned visual characteristics, the operator may be able to toggle between a view or GUI that is based on the current altitude and a view or GUI that is based on the planned altitude. Being able to reassign visual characteristics based on a planned altitude, different from the current altitude, may aid the operator in determining what altitude would be preferable at which to navigate an airspace. For example, an operator may provide a lower planned altitude than the current altitude of aircraft 110, and may elect not to navigate to that lower altitude based on the number of buildings/structures that would be collision threats at the lower planned altitude.

Systems and methods for providing contextual building height information to aircraft operators in accordance with the present disclosure may be able to provide an aircraft operator with contextually relevant information regarding the relative heights of buildings and structures along the aircraft's path in a visual manner. Displaying imagery that visually represents height characteristics dynamically based on the altitude of the aircraft may reduce or eliminate the need for an aircraft operator to manually change displays or consult alternate sources of information to receive relevant information in real time. By dynamically visually coding buildings and other structures in the airspace to emphasize buildings or structures of current relevance to the flight path, and by reducing the amount an aircraft operator may have to shift their focus, aircraft operators may exhibit an increased awareness of how the aircraft may safely proceed through the airspace at any given time.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative.

As used herein, the singular forms "a," "an," and "the" include plural reference unless the context dictates otherwise. The term "or" is meant to be inclusive and means either, any, several, or all of the listed items.

The phrase "in one embodiment" as used herein does not necessarily refer to the same embodiment throughout the specification, and the phrase "in another embodiment" as used herein does not necessarily refer to a different embodiment. It is intended, for example, that claimed subject matter include combinations of exemplary embodiments in whole or in part.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method of providing contextual building height information to one or more operators of an aircraft comprising:
    obtaining aircraft flight information including a current position and a current altitude of the aircraft;
    retrieving, from a database, building information for one or more buildings located in a flight path area, the flight path area including the current position of the aircraft;
    assigning one or more visual characteristics to each of the one or more buildings located in the flight path area based at least in part on the building information and the current altitude of the aircraft;
    displaying, at a display within the aircraft for the one or more operators of the aircraft, the one or more buildings located in the flight path area with the assigned one or more visual characteristics;
    receiving flight plan information including a planned altitude for the aircraft;
    assigning one or more updated visual characteristic to at least a portion of the one or more buildings located in the flight path area based at least in part on the building information and the planned altitude for the aircraft; and
    selectively displaying, at the display within the aircraft, the at least a portion of the one or more buildings with the one or more updated visual characteristic.

2. The method of claim 1, wherein the aircraft flight information further includes a target destination.

3. The method of claim 1, wherein building information includes a height value for each of the one or more buildings.

4. The method of claim 3, wherein assigning the one or more visual characteristics to each of the one or more buildings further includes:
    determining a height difference between the current altitude of the aircraft and the height value for each of the one or more buildings; and
    generating one or more building groups based on the height difference calculated for each of the one or more buildings, wherein the one or more buildings within each of the one or more building groups is assigned the same one or more visual characteristics.

5. The method of claim 4, wherein the one or more building groups include buildings of the one or more buildings that have height differences between the current altitude of the aircraft and the height value for each of the one or more buildings that are within a predefined range.

6. The method of claim 4, wherein the one or more building groups include buildings of the one or more buildings that have height differences between the current altitude of the aircraft and the height value for each of the one or more buildings that are within a dynamic range, wherein the dynamic range is based at least in part on a current speed of the aircraft.

7. The method of claim 1, wherein assigning the one or more visual characteristics to each of the one or more buildings located in the flight path area includes:
    determining which of the one or more buildings is located within a safety envelope of the current position and the current altitude of the aircraft; and
    assigning an animated visual characteristic of the one or more visual characteristics to the buildings of the one or more buildings determined to be within the safety envelope.

8. The method of claim 7, wherein the animated visual characteristic is blinking or flashing the assigned one or more visual characteristics.

9. The method of claim 1, further comprising:
    assigning the one or more updated visual characteristics to each of the one or more buildings located in the flight path area based at least in part on the building information and the planned altitude for the aircraft;
    wherein the flight plan information defines user input received from the one or more operators of the aircraft.

10. The method of claim 9, wherein the one or more operators of the aircraft are able to toggle between viewing the one or more buildings located in the flight path area with the assigned one or more visual characteristics and the one or more buildings located in the flight path area with the updated one or more visual characteristics.

11. A system comprising:
    a display including one or more screens;
    a memory storing instructions; and
    a processor executing the instructions to perform a process for providing contextual building height information to one or more operators of an aircraft including:
        obtaining aircraft flight information including a current position and a current altitude of the aircraft;
        retrieving, from a database, building information for one or more buildings located in a flight path area, the flight path area including the current position of the aircraft;
        assigning one or more visual characteristics to each of the one or more buildings located in the flight path area based at least in part on the building information and the current altitude of the aircraft;
        displaying, at a display within the aircraft for the one or more operators of the aircraft, the one or more buildings located in the flight path area with the assigned one or more visual characteristics on the display;
        receiving flight plan information including a planned altitude for the aircraft;
        assigning one or more updated visual characteristic to at least a portion of the one or more buildings located in the flight path area based at least in part on the building information and the planned altitude for the aircraft; and
        selectively displaying, at the display within the aircraft, the at least a portion of the one or more buildings with the one or more updated visual characteristic.

12. The system of claim 11, wherein building information includes a height value for each of the one or more buildings.

13. The system of claim 12, wherein assigning the one or more visual characteristics to each of the one or more buildings further includes:
   determining a height difference between the current altitude of the aircraft and the height value for each of the one or more buildings; and
   generating one or more building groups based on the height difference calculated for each of the one or more buildings, wherein the one or more buildings within each of the one or more building groups is assigned the same one or more visual characteristics.

14. The system of claim 13, wherein the one or more building groups include buildings of the one or more buildings that have height differences between the current altitude of the aircraft and the height value for each of the one or more buildings that are within a predefined range.

15. The system of claim 14, wherein the one or more building groups include buildings of the one or more buildings that have height differences between the current altitude of the aircraft and the height value for each of the one or more buildings that are within a dynamic range, wherein the dynamic range is based at least in part on a current speed of the aircraft.

16. The system of claim 11, wherein assigning the one or more visual characteristics to each of the one or more buildings located in the flight path area includes:
   determining which of the one or more buildings is located within a safety envelope of the current position and the current altitude of the aircraft; and
   assigning an animated visual characteristic of the one or more visual characteristics to the buildings of the one or more buildings determined to be within the safety envelope.

17. The system of claim 16, wherein the animated visual characteristic is blinking or flashing the assigned one or more visual characteristics.

18. The system of claim 11, further comprising:
   assigning the one or more updated visual characteristics to each of the one or more buildings located in the flight path area based at least in part on the building information and the planned altitude for the aircraft;
   wherein the flight plan information defines user input received from the one or more operators of the aircraft.

19. The system of claim 18, wherein the one or more operators of the aircraft are able to toggle the display between viewing the one or more buildings located in the flight path area with the assigned one or more visual characteristics and the one or more buildings located in the flight path area with the updated one or more visual characteristics.

20. A system comprising:
   an aircraft control system;
   a display within the aircraft, the display including one or more screens;
   a memory storing instructions; and
   a processor executing the instructions to perform a process for providing contextual building height information to one or more operators of an aircraft including:
      obtaining aircraft flight information including a current position and a current altitude of the aircraft from the aircraft control system;
      retrieving, from a database, building information including a height value for each of one or more buildings located in a flight path area, the flight path area including the current position of the aircraft;
      determining a height difference between the current altitude of the aircraft and the height value for each of the one or more buildings;
      generating one or more building groups based on the height difference calculated for each of the one or more buildings, wherein each of the one or more building groups includes buildings of the one or more buildings having height differences within a predetermined range;
      determining which of the one or more buildings is located within a safety envelope of the current position and the current altitude of the aircraft;
      assigning one or more visual characteristics to each of the one or more buildings such that each of buildings in the one or more building groups is assigned the same one or more visual characteristics;
      assigning an animated visual characteristic to the buildings of the one or more buildings determined to be within the safety envelope; and
      displaying on the display within the aircraft for the one or more operators of the aircraft, the one or more buildings located in the flight path area with the assigned one or more visual characteristics;
   receiving flight plan information including a planned altitude for the aircraft;
   assigning one or more updated visual characteristic to at least a portion of the one or more buildings located in the flight path area based at least in part on the building information and the planned altitude for the aircraft; and
   selectively displaying, at the display within the aircraft, the at least a portion of the one or more buildings with the one or more updated visual characteristic.

* * * * *